Figure 1:
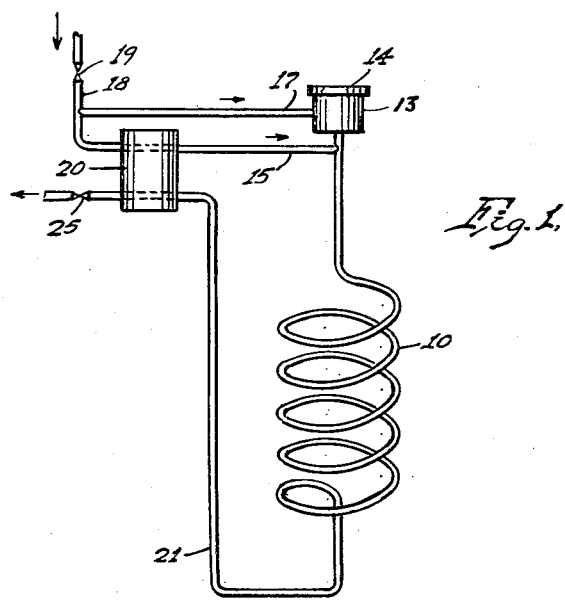

June 17, 1958 — J. H. TRACHT — 2,839,152

CHROMATOGRAPHY METHOD AND APPARATUS

Filed Oct. 23, 1956

INVENTOR.
Joseph H. Tracht.
BY
ATTORNEY

United States Patent Office 2,839,152
Patented June 17, 1958

2,839,152

CHROMATOGRAPHY METHOD AND APPARATUS

Joseph H. Tracht, Pittsburgh, Pa., assignor to Gulf Research & Development Company, Pittsburgh, Pa., a corporation of Delaware Application October 23, 1956, Serial No. 617,731

2 Claims. (Cl. 183—2)

This invention relates to a method and apparatus for separating fluid mixtures and more particularly to a partition chromatography method and apparatus adapted to use of high inlet pressures for the carrier gas.

Partition chromatography has been widely used for the separation and analysis of fluid mixtures. Its principles have been described in the literature, for example, in the article by D. H. Lichtenfels et al., Analytical Chemistry, volume 27, No. 10, October 1955, pages 1510–13. The article describes the analytical separation of a fluid mixture by gas-liquid partition chromatography. A small sample of a volatile mixture to be separated and analyzed is injected by means of a hypodermic needle through a self-sealing rubber cap into the end of a long narrow column packed with an inert, granular material on which has been deposited a liquid coating of a nonvolatile solvent. The column is eluted with an inert carrier gas such as helium, hydrogen or nitrogen. The components of the volatile mixture partition between a moving gas phase in the vapor space between particles and a stationary liquid phase absorbed in the liquid coating of the particles. This causes the components of the mixture to move forward with individual velocities which are less than that of the carrier gas. The velocity with which a particular component moves is dependent on its partition coefficient, which can be defined as the ratio of the concentration of a component in the stationary liquid phase to its concentration in the moving gas phase. The partition coefficient varies for different componnds and, therefore, the components of the mixture move through the column at different speeds. If the column is long enough the components emerge one by one, usually in the order of boiling points for a homologous series. The separated components are identified as they emerge from the partition column by suitable detecting means such as a thermal conductivity cell.

As mentioned above, the small charge of sample is normally injected by hypodermic needle into a self-sealing feed inlet of the partition column. Conventionally, the charge inlet is a rubber cap of the type used on self-sealing serum bottles. Through the use of this type of charge inlet the mixture to be analyzed can be injected by a needle, such as a micro-syringe, without introducing air or other contaminants into the partition column. When the carrier gas is introduced to the column at an inlet pressure only a little above atmospheric pressure the conventional method and apparatus perform very satisfactorily. However, when the carrier gas inlet pressure is considerably above atmospheric pressure it is possible for gas to escape through the feed inlet either by leaking through the small holes pierced in the self-sealing cap or, if the pressure is very high, by blowing the rubber cap entirely off the inlet end of the column. The method and apparatus of the present invention make possible the use of super-atmospheric inlet pressures for a partition chromatography column while preventing the escape of gas through the charge inlet.

I have mentioned that the method and apparatus of the invention are used when the carrier gas inlet pressure to a partition column is high. There are different reasons for the use of high inlet pressures. For example, if the mixture being separated or analyzed consists of components that have partition coefficients that are not widely separated, it may be necessary to use a very long partition column to obtain good separation. As the length of a partition column increases the pressure drop across the column increases and a higher carrier gas inlet pressure must be used to elute the column. Thus, for example, a ten foot column packed with 40–80 mesh granular kieselguhr which has a surface coating of dioctyl phthalate may require a carrier gas inlet pressure of 10–15 pounds per square inch gauge for reasonably rapid separation when the column outlet is at atmospheric pressure. However, if the column length is increased, for example, to 30 feet, the flow resistance and the pressure drop across the column will increase to such an extent that a carrier gas inlet pressure of 25–40 pounds per square inch gauge or more will be required in order to obtain the same elution rate as was obtained with the shorter column. This higher inlet pressure may be sufficient to blow the self-sealing inlet cap off the column, although the cap can be made to withstand rather high pressures by fastening it firmly to the column. The most serious problem, however, is in the leakage of high pressure gas through the small holes that are pierced in the self-sealing cap by needle injection of charge mixtures.

Even higher carrier gas inlet pressures than those mentioned may be encountered when it is desired to impose high pressure throughout the partition column to improve the separation of a particular type of mixture. Thus, for example, in separating certain highly volatile substances it may be desirable, in order to increase the absorption of one or more components in the stationary liquid phase, to use high pressure within the column. A pressure at the outlet end of the column of 100 pounds per square inch gauge or more might be maintained. Because of the pressure drop across the column the carrier gas inlet pressure will be still higher than the outlet pressure. For any of these circumstances under which high inlet pressure of the carrier gas is necessary or desirable the method and apparatus of the invention are particularly advantageous.

In general, the method of the invention comprises injecting a mixture to be separated into the self-sealing charge inlet of a partition chromatography column. Thereafter, a carrier gas is introduced to the column at a point immediately below the charge inlet at an elevated pressure and, simultaneously, carrier gas is introduced and maintained at the same elevated pressure on the opposite side of the charge inlet so as to provide substantially equal pressures on each side of the self-sealing charge inlet.

The apparatus of the invention in general comprises a partition chromatography column, a resilient, puncturable, self-sealing cap for the inlet end of the column, a housing surrounding the cap, a gas-tight closure for the housing, a line for introducing gas to the housing, and a line for introducing gas to the partition chromatography column immediately below said housing, both of said lines communicating with a common source of carrier gas.

Figure 2:
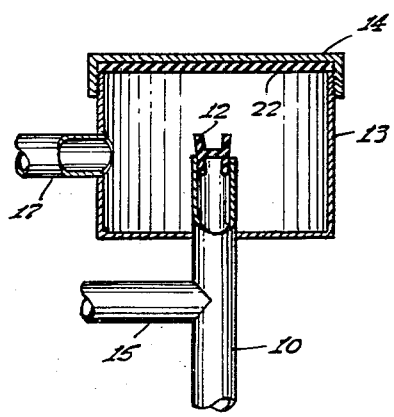

The method and apparatus of the invention will be described in more detail by referring to the drawing of which:

Figure 1 is a schematic diagram of a partition chromatography column and its accessories; and Figure 2 is an enlarged sectional view of the charge inlet region of the column.

In the apparatus of Figure 1 the partition chromatography column 10 is in the form of a long coiled tube. The column may, for example, be a coil of steel tubing 30 feet in length and of ¼ inch inside diameter. Column 10 is filled with a granular solid material, such as granular kieselguhr of 20–100 mesh size. The granular particles have a surface coating of a high-boiling organic solvent such as dioctyl phthalate. Any of the inert granular materials known for use in partition chromatography can be employed. Also any of the solvents which are known for use as partitioning liquids in partition chromatography can be used. These are usually non-volatile or high-boiling solvents and include such materials as phthalate esters, silicone fluids, petroleum wax, etc.

At its upper end the partition column 10 is provided with a charge inlet 12. In the apparatus of the drawing this is a resilient, puncturable, self-sealing rubber cap of the type used on serum bottles. The charge inlet is enclosed in a gas-tight housing 13 which is provided with a removable closure 14. Directly below the feed inlet and its housing a carrier gas line 15 enters the upper end of the partition column 10. Another carrier gas line 17 enters the housing 12. Lines 15 and 17 have a common source of carrier gas which, as the drawing shows, is the carrier gas line 18. This line is provided with a valve 19 and communicates with a means for supplying carrier gas, such as a high pressure gas cylinder.

The apparatus of Figure 1 is provided with a detecting means such as the thermal conductivity cell 20 which has a reference channel and a testing channel. Carrier gas line 15 communicates with the reference channel and the effluent line 21 from column 10 communicates with the testing channel of the cell. The thermal conductivity cell is electrically connected with a recording potentiometer, not shown in the drawing, which continuously plots thermal conductivity cell signals against time and provides a qualitative and quantitative analysis of the effluent which leaves column 10 via line 21.

Figure 2 shows the charge inlet means of the invention in detail. In particular, it shows that the closure means for the charge inlet housing 13 can take the form of a screw threaded cover 14 having a resilient gasket 22. The cover can thus be threaded on to the housing to close the housing and provide a gas-tight seal.

The method of the invention is carried out in the following manner. The cover 14 is removed from housing 13. A small amount of a fluid mixture, for example, 0.1 ml. of a gasoline being analyzed, is injected by means of a micro-syringe through the rubber cap 12. The cover 14 is then replaced and is screwed into gas-tight connection with the housing. Carrier gas is then admitted to the system by opening the valve 19. The carrier gas, which can be helium, nitrogen or any of the gases that are known for use as carrier gases in partition chromatography, enters lines 17 and 15 at superatmospheric pressure. The desired pressure within the partition column is imposed by setting the valve 25. As a result of the open communication between line 18 and its forks, lines 17 and 15, the gas pressures in lines 15 and 17 are equal and thus equal pressures are imposed on both sides of the charge inlet cap 12. Consequently, any reasonably high inlet pressure of carrier gas can exist within the partition column without causing gas to escape through the charge inlet.

Obviously many modifications and variations of the invention as hereinbefore set forth may be made without departing from the spirit and scope thereof and therefore only such limitations should be imposed as are indicated in the appended claims.

I claim:

1. A method for separating fluid mixtures by partition chromatography which comprises injecting a charge mixture to be separated into the self-sealing charge inlet of a partition chromatography column, introducing carrier gas into the partition column at super-atmospheric inlet pressure at a point immediately below the charge inlet, simultaneously introducing carrier gas and maintaining the same super-atmospheric pressure on the opposite side of the charge inlet from the first mentioned point of introduction of carrier gas so as to provide substantially equal pressures on each side of the self-sealing charge inlet, and withdrawing an effluent from the partition column comprising carrier gas and separated components of the charge mixture.

2. A partition chromatography apparatus which comprises a partition chromatography column packed with solid particles having a surface coating of a partitioning liquid, a puncturable self-sealing charge inlet cap for the charge inlet end of the partition column, a housing surrounding the charge inlet cap, a gas-tight closure for the housing, a line for introducing gas into the housing and a line for introducing gas into the partition column immediately below said housing, both of said lines communicating with a common source of carrier gas.

References Cited in the file of this patent

"Gas-Liquid Partition Chromatography" by D. H. Litchtenfels et al., Analytical Chemistry, volume 27, Number 10, October 1955, pages 1510–13.